United States Patent [19]

Thompson

[11] Patent Number: 5,469,654
[45] Date of Patent: Nov. 28, 1995

[54] APPARATUS FOR PROVIDING A MOISTURE SEAL FOR A WET FOAM USED TO CONTAIN A STEM OF A FLOWER AND METHOD THEREFOR

[76] Inventor: Marcia C. Thompson, 3728 E. Medlock Dr., Phoenix, Ariz. 85018

[21] Appl. No.: 196,561

[22] Filed: Feb. 15, 1994

[51] Int. Cl.$^6$ ................ A01G 5/00; A47G 7/00
[52] U.S. Cl. .................... 47/41.12; 47/41.01
[58] Field of Search ............ 47/41.12, 59 CO, 47/64, 41.01

[56] References Cited

U.S. PATENT DOCUMENTS

| 1,725,490 | 8/1929 | Talbot | 47/41.01 |
| 2,366,377 | 1/1945 | Zois | 47/41.12 |
| 2,774,187 | 12/1956 | Smithers | 47/41.12 |
| 3,826,041 | 7/1974 | King | 47/41.12 |
| 5,035,080 | 7/1991 | Kafka | 47/64 |
| 5,142,820 | 9/1992 | Aquino | 47/41.12 |

FOREIGN PATENT DOCUMENTS

| 5068 | 8/1901 | Austria | 47/41.12 |
| 695773 | 12/1930 | France | 47/41.12 |
| 2373258 | 8/1978 | France | 47/41.12 |
| 1778554 | 12/1972 | Germany | 47/41.12 |
| 6-046670 | 2/1994 | Japan | 47/41.01 |
| 2086222 | 5/1982 | United Kingdom | 47/41.12 |
| 2193889 | 2/1988 | United Kingdom | 47/41.12 |

OTHER PUBLICATIONS

Sno—pak floral base brochure, Sept. 1, 1948.

Primary Examiner—Ramon S. Britts
Assistant Examiner—Joanne C. Downs
Attorney, Agent, or Firm—Harry M. Weiss; Jeffrey D. Moy

[57] ABSTRACT

A water saturable foam is encased within a rubber sheath. The foam is laden with water. A stem of a flower may be embedded in the foam.

2 Claims, 1 Drawing Sheet

APPARATUS FOR PROVIDING A MOISTURE SEAL FOR A WET FOAM USED TO CONTAIN A STEM OF A FLOWER AND METHOD THEREFOR

BACKGROUND OF THE INVENTION

1. Field of Invention

This invention is in the field of apparatus for decorative cut flower arrangements and methods therefor and, more particularly, is an apparatus and method for sealing moisture within a saturable foam wherein one or more flower stems are embedded.

2. Description of the Prior Art

The beauty and fragrance of a cut flower is most commonly prolonged by maintaining the stem of the flower in a moist environment. When, for example, from one to three cut flowers are being transported, their stems are typically maintained within a water tube that contains water. A disadvantage of the water tube is that water easily spills therefrom thereby reducing the life of the flowers.

The beauty and fragrance of an arrangement of cut flowers is most commonly prolonged by utilizing a water saturable foam within a container. The foam has a green color and a texture that causes it to resemble a lichen; it is marketed under the trade designation, Oasis.

Stems of a plurality of cut flowers are typically embedded within the foam when it is laden with water. A disadvantage of the foam is that water evaporates therefrom and leaks through a hole that is typically through the center of the bottom of the container.

There is a need for apparatus and a method for reliably and economically maintaining the stem of the cut flower in the moist environment.

SUMMARY OF THE INVENTION

An object of the present invention is to maintain the stem of a cut flower in a moist environment and method therefor.

Another object of the present invention is to substantially seal a water saturable foam wherein stems of one or more cut flowers are disposed.

BRIEF DESCRIPTION OF THE PREFERRED EMBODIMENT

According to the present invention, a water saturable foam is encased within a flexible sheath.

The present invention may be used for maintaining a moist environment for a stem of a cut flower.

Other objects, features and advantages of the invention will be apparent from the following description of the embodiments thereof and the accompanying drawing.

DESCRIPTION OF THE EMBODIMENTS

Figure 1:
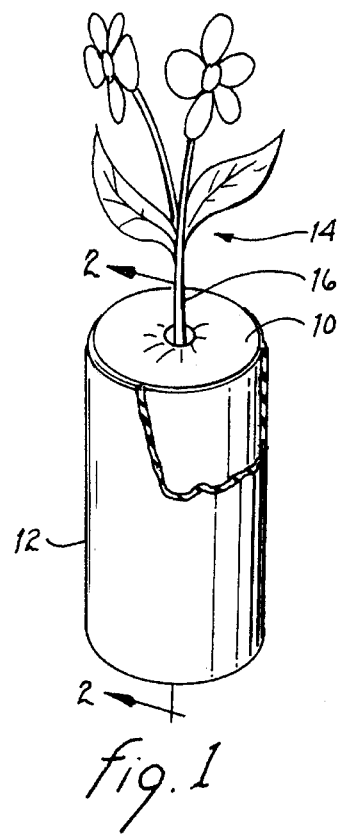
FIG. 1 is a perspective view of a first embodiment of the present invention with a part broken away.
Figure 2:
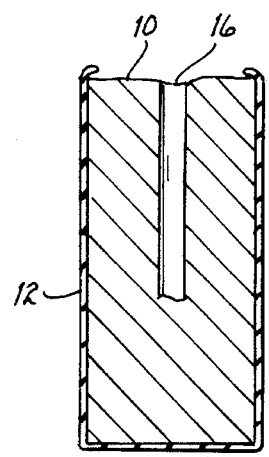
FIG. 2 is a view of FIG. 1 taken along the line 2—2 with a part broken away.

As shown in FIGS. 1 and 2, in a first embodiment, a water saturable foam 10 is of a cylindrical shape. The side and bottom of foam 10 are encased within a flexible, elastic watertight sheath 12. In this embodiment, sheath 12 is made from rubber. In an alternative embodiment, sheath 12 is inelastic.

Foam 10 is laden with water; preferably, it is substantially saturated with water. Foam 10 has a color and texture that causes it to resemble a lichen.

A flower 14 has a stem 16 embedded within foam 10. In this embodiment, foam 10 and sheath 12 form a substantially cylindrical structure that is on the order of one half inch in diameter and two inches long. In an alternative embodiment, the diameter and length may be larger.

Because stem 16 is embedded, it remains moist. Unlike the water tube, water does not leak from the bottom of sheath 12 which is impenetrable and imporous and there is not a complete loss of moisture when sheath 12 rests on its side for a substantial period of time. Therefore, the present invention offers a substantial advantage in the transportation of cut flowers over long distances since stems of the cut flowers are maintained in a moist environment.

Figure 3:
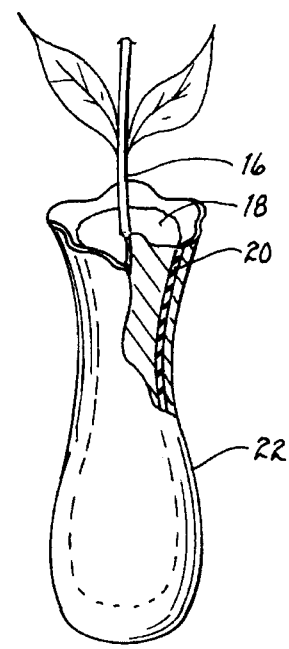
FIG. 3 is a perspective view of a second embodiment of the present invention.

As shown in FIG. 3, in a second embodiment, a water saturable foam 18 and a sheath 20 are stuffed into a vase 22. Foam 18 and sheath 20 are fabricated from materials similar to those used in the fabrication of foam 10 and sheath 12, respectively.

It should be understood that foam 18 and sheath 20 are amorphous, thereby causing them to form a structure substantially complimentary to the interior of vase 22. When foam 18 is laden with water, stem 16 is embedded therein. Stem 16 remains moist for reasons given hereinbefore.

Figure 4:
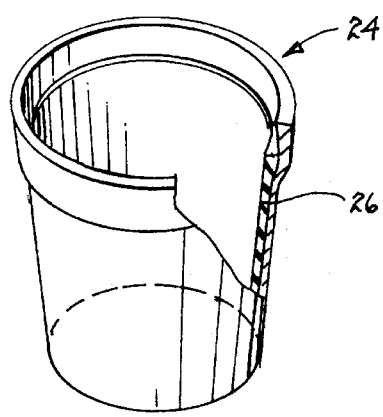
FIG. 4 is a perspective view of a third embodiment of the present invention, with a portion broken away.
Figure 5:
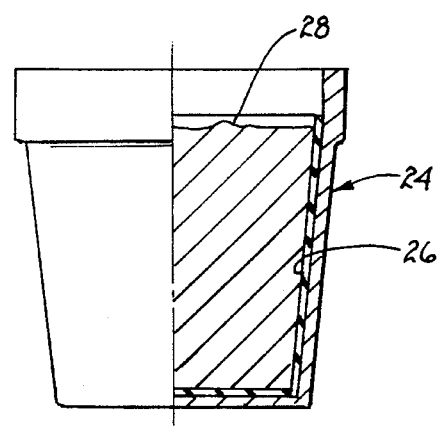
FIG. 5 is a side elevation of a container of FIG. 4, with a part broken away, filled with a water saturable foam.

As shown in FIG. 4, a container 24 has an interior lining 26 fabricated from a material similar to that used for fabrication of sheath 12. As shown in FIG. 5, container 24 is filled with a water saturable foam 28, similar to foam 10. Container 24 is of a size suitable for embedding a plurality of stems therein. After foam 28 has been laden with water, stems embedded therein remain moist for reasons given hereinbefore.

While the invention has been particularly shown and described with reference to embodiments thereof, it should be understood by those skilled in the art that changes in form and detail may be made therein without departing from the spirit and scope of the invention.

I claim:

1. Apparatus for maintaining a stem of a flower in a moist environment, comprising, in combination:

a water saturable foam; and a impenetrable, imporous, flexible watertight sheath comprised of a rubber-type material that encases a portion of said foam, said sheath and said foam forming a structure having a substantially cylindrical shape, wherein said sheath further includes a peripheral lip portion which extends at least a minor distance over a top of said foam while leaving a substantial portion of said top of said foam exposed; and wherein said foam is tightly encased by said sheath on the sides and bottom thereof leaving no space therebetween.

2. The apparatus of claim 1 wherein said foam is of a green color and texture that causes it to resemble a lichen.

* * * * *